United States Patent [19]

Demers

[11] 4,287,256

[45] Sep. 1, 1981

[54] WAFER AND BOULE PROTECTION DURING THE BLADE RETURN STROKE OF A WAFER SAW

[75] Inventor: Robert R. Demers, Lawrenceville, N.J.

[73] Assignee: RCA Corporation, New York, N.Y.

[21] Appl. No.: 155,999

[22] Filed: May 30, 1980

Related U.S. Application Data

[62] Division of Ser. No. 973,458, Dec. 26, 1978, Pat. No. 4,227,348.

[51] Int. Cl.³ .......................... B32B 1/04; B32B 7/06; B32B 33/00

[52] U.S. Cl. .................................... 428/375; 428/397; 428/542

[58] Field of Search ........................ 428/375, 397, 542

[56] References Cited

U.S. PATENT DOCUMENTS

| | | | |
|---|---|---|---|
| 2,874,688 | 2/1959 | Biesany | 125/23 C |
| 2,960,978 | 11/1960 | Dustan | 125/13 |
| 3,266,967 | 8/1966 | Saunders | 125/23 R |
| 3,577,861 | 5/1971 | Bender | 51/73 R |
| 3,702,604 | 11/1972 | Jones | 125/14 |

*Primary Examiner*—James C. Cannon

*Attorney, Agent, or Firm*—Birgit E. Morris; Donald S. Cohen; Robert P. Seitter

[57] ABSTRACT

The quality of the as-sawn surfaces of a wafer is improved by preventing the saw blade from striking the wafer surfaces during the blade return stroke by leaning the just-sawn wafer away from the blade and by slightly retracting the face of the ingot from the plane of the saw blade. A fluid-jet-induced deformation of the binding compound portion of the ingot is preferred as a means of leaning the wafer away from the saw blade. Using this technique a number of wafers may be successively sawn from an ingot and kept attached to the ingot by the binding compound without the surfaces of the wafers being scored during the return strokes of the blade.

7 Claims, 6 Drawing Figures

WAFER AND BOULE PROTECTION DURING THE BLADE RETURN STROKE OF A WAFER SAW

BACKGROUND OF THE INVENTION

1. Field of the Invention

The invention relates to the field of saws for cutting wafers from bulk material and is more particularly applicable to the field of slicing monocrystalline wafers from monocrystalline boules.

2. Prior Art

Wafers for use in the electronics industries are generally sliced from monocrystalline boules using wafer saws. The newly sliced wafers are lapped and mechanically polished to remove saw damage such as gouges and surface unevenness. The mechanically polished wafers are surface etched to remove any surface damage caused by or not removed by the lapping and polishing. After etching, the wafers are ready for the beginning of the electronic device fabrication process.

Wafer production would be simpler and more economical, if as-sawn wafers were flat enough and smooth enough that the lapping and mechanical polishing steps could be eliminated. In order to achieve this goal, improvements are needed in the present wafer sawing process to provide much smoother as-sawn wafers.

Prior art wafer saw systems are of two main types. The first type completely severs each wafer from the boule as it is sliced. The second type utilizes an ingot comprised of the boule and a binding compound which holds the individual sliced wafers on the ingot. After a saw of the second type has sliced a number of wafers, the already sliced wafers are removed from the ingot as a group.

With wafer saws of the first type, there are problems with collecting the wafers and avoiding damage thereto. However the just-sawn surface of the wafer cannot be damaged by the saw blade during the return stroke of the blade because the wafer is not present during the blade return stroke. Scoring of the just-sawn face of the boule during blade return has been avoided by slightly retracting the face of the boule from the plane of the saw blade in order to provide enough clearance to prevent the blade from striking the boule during its return stroke. Systems of this type are disclosed in U.S. Pat. Nos. 2,960,978 and 3,702,604.

Unfortunately, no such protective systems are available for saws of the second type. As a result, both the just-sawn face of the wafer and the just-sawn face of the ingot are scored by the blade during its return stroke.

SUMMARY OF THE INVENTION

These prior art problems with saws of the second type are overcome by the present invention (1) by utilizing a fluid jet to lean the just-sawn wafer away from the face of the boule by deforming the binding material and preferably (2) by slightly retracting the ingot prior to the saw blade return stroke. This holds both the just-sawn face of the wafer and the just-sawn face of the boule out of contact with the blade during the blade return stroke.

DETAILED DESCRIPTION OF THE PREFERRED EMBODIMENT

The invention is a modification of the well-known wafer sawing technique in which an ingot is formed by casting a binding material against the boule to be sliced as a support structure for retaining the individual wafers in their pre-slicing position after they are sawn from the boule. The binding material is selected to be sufficiently rigid and sufficiently adhesive to hold the just-sawn wafer in the same position it was in prior to sawing. An epoxy material is preferred for use as the binding material. Materials of this type are well-known in the art.

Figure 1:
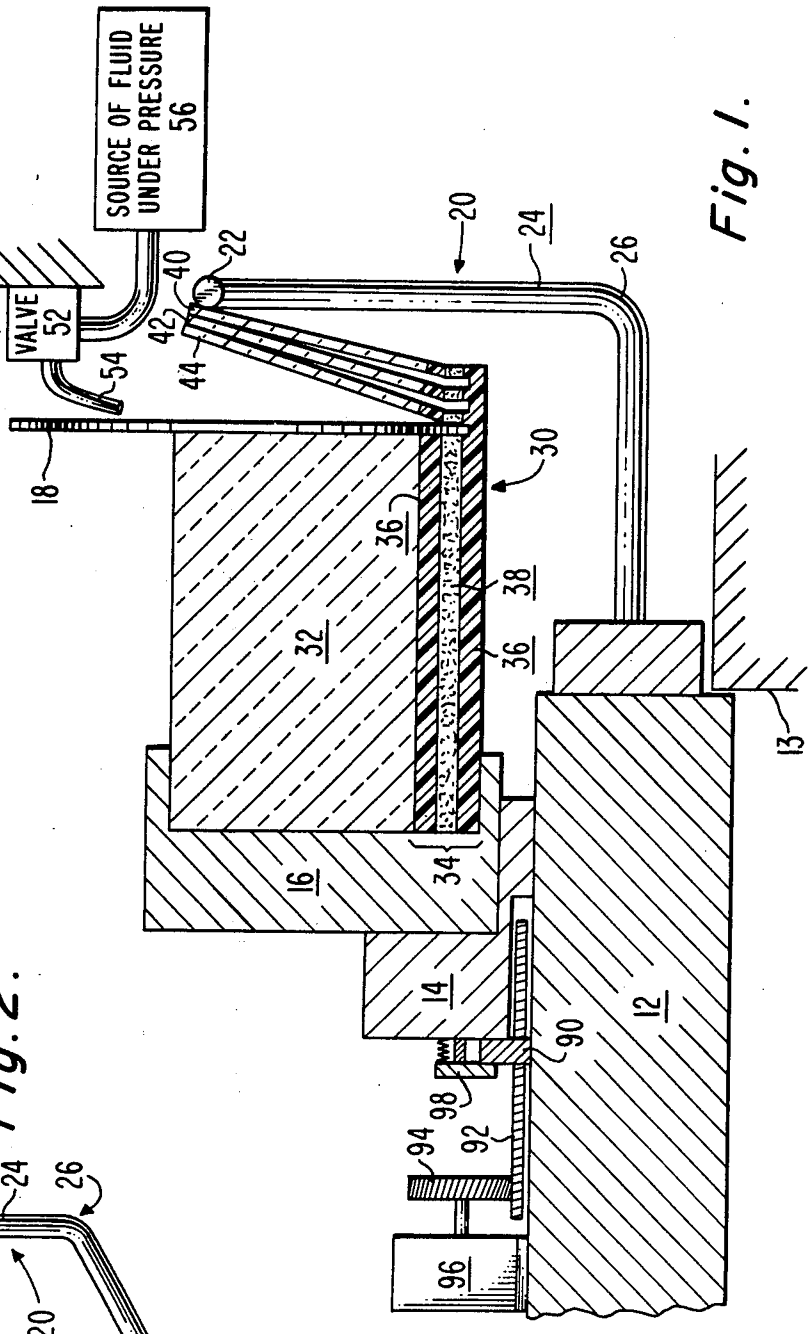
FIG. 1 is a schematic illustration in accordance with this invention of the portion of a wafer saw in the vicinity of the saw blade and ingot.

FIG. 1 is a side view, partially in cross-section of the portion of a wafer saw of the type which slices several wafers before they are removed from the ingot. In FIG. 1, only that portion of the saw in the vicinity of the blade 18 is illustrated. An ingot 30 is shown in position for slicing. The ingot 30 is held by an ingot chuck 16 which is carried by an ingot carrier 14 which rides on and may be moved with the respect to a movable table 12. The ingot carrier 14 may be advanced by a dog 90 which is driven by a lead screw 92. The lead screw 92 is driven by a gear 94 on the shaft of a stepping motor 96. In the prior art configuration of this saw, if the motor is run forward, the ingot carrier is advanced to position the next wafer for slicing. If the motor is run backward, the dog is retracted, but the ingot carrier 14 remains stationary.

When it is desired to bring the ingot into position for slicing, the table 12 is advanced toward the plane of the saw blade 18 to a predetermined position, such as against a stop 13. The ingot carrier 14 is then indexed until the ingot is positioned where a wafer of a desired thickness will be sliced by the saw blade 18.

In accordance with the invention, several modifications (shown in FIG. 1) are made to the prior art configuration of this type of saw. These modifications allow the just-sawn wafer to be leaned away from the blade and the just-sawn face of the boule to be retracted from the plane of the blade prior to the blade return stroke. This prevents the blade from scoring the wafer and the face of the boule. The modifications are: First, a spring-loaded dog captivator 98 which is added to the ingot carrier 14; second, a wafer support 20 which is attached to the table 12; and third, a force application system 50 which is attached to the saw housing.

The dog captivator 98 holds the ingot carrier 14 against the dog 90 as the motor is run backward. Thus, running the motor backward causes the dog 90 to retract the ingot carrier 14 away from the plane of the saw blade.

Figure 2:
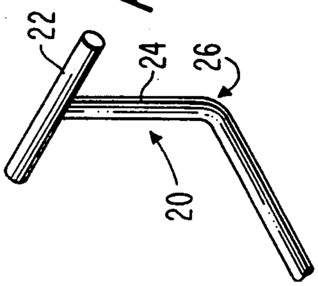
FIG. 2 is an illustration of a preferred configuration of the wafer support in FIG. 1.

The wafer support 20 props a wafer which is leaned away from the blade and prevents it from leaning so far that it breaks loose or is damaged. Wafer support 20 preferably comprises a cross bar 22 parallel to the plane of the saw blade and a support arm 24 which attaches the support bar 22 to the table 12. As illustrated in FIG. 2, the configuration of the bars 22 and 24 resemble a letter T with the leg of the T bent at a point 26 which is part way up the leg. Since the support bar 22 is affixed to the table 12 by the support arm 24, it moves in unison with the table 12. Thus, when the table 12 is moved to its predetermined, ready-for-sawing position, the support bar 22 is placed in a predetermined position with respect to the plane of the saw blade.

The force application system 50 provides a means of leaning the just-sawn wafer away from the blade. Force application system 50 is attached to the saw housing in a position which enables it to apply a force to a just-sawn wafer to lean the wafer away from the saw blade to rest against the wafer support 20. The force application system 50 preferably comprises a valve 52 and an outlet tube 54 and a source 56 of fluid under pressure. The outlet tube is fixed to the saw structure in a position which directs a jet of fluid (when valve 52 is on) to force a newly sliced wafer away from the blade surface toward the support bar 22.

The fluid of the jet may comprise a liquid or a gas, but preferably is a gas such as air. Air is preferred because it does an adequate job and is easy to provide and control. Further, a gas introduces no disposal or splash problems and will not contain abrasives. The jet of fluid may lean the wafer toward the support 20 either by direct pressure or by fluid dynamic affects. Direct pressure is preferred.

In accordance with the invention, the configuration of the support structure portion (binding material) of the ingot is modified from the prior art configuration by the inclusion therein of a preferential region of deformation. Once a wafer has been sliced, this preferential region of deformation becomes a region where deformation of the support structure portion of the ingot can take place in response to the application to the just-sawn wafer of a force which tends to lean the wafer away from the saw blade. Deformation of the region of preferential deformation allows the wafer to lean against and be supported by the wafer support 20, without breaking or separating from the ingot. It is preferred that the region of preferential deformation be localized in order to provide maximum control of the wafer. However, a non-localized region may be utilized if desired.

In accordance with the invention, the ingot 30 which is shown mounted in ingot carrier 14 in FIG. 1 comprises a boule 32 of monocrystalline material which is to be sliced and a support structure 34 comprised of a layer of substantially rigid binding material 36 and a layer 38 of compliant material which is affixed to the rigid binding material 36.

In FIG. 1, individual sliced wafers 40, 42 and 44 which are still attached to the ingot 30 are illustrated in the position they occupy during the blade return stroke in accordance with the invention. These wafers preferably remain in this position until they are removed from the ingot 30 after the slicing of a number of wafers.

Figure 3:
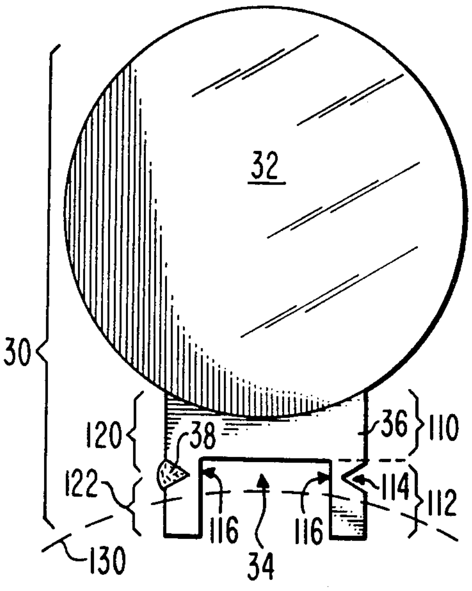
FIG. 3 illustrates a preferred ingot configuration for use with the saw blade return system in accordance with the invention.

The preferred configuration of the support structure 34 is illustrated in FIG. 3 in a cross-section taken perpendicular to the length of the ingot. The support structure 34 comprises a rigid binding material 36 and a compliant material 38. The boule 32 is bound to the cast rigid binding material 36 by the normal adhesion acquired during the casting process.

The rigid binding material 36 has a main body 110 which adheres to the boule 32. Main body 110 may be referred to as a boule gripping portion of the binding material 36. Two legs 112 depend from the main body 110 of the binding material. Each leg 112 has a V-shaped notch 114 therein. The notch 114 is preferably formed during the casting of the rigid binding material. However, it may be subsequently cut is so desired. The notches 114 divide the binding material into an upper, wafer adherent portion 120, and a lower, ingot adherent portion 122.

In FIG. 3, the notch 114 in the lefthand leg of the support structure is shown filled with the compliant material 38 while the notch 114 in the righthand leg is illustrated in its as-formed condition, prior to being filled with the compliant material.

Figure 4:
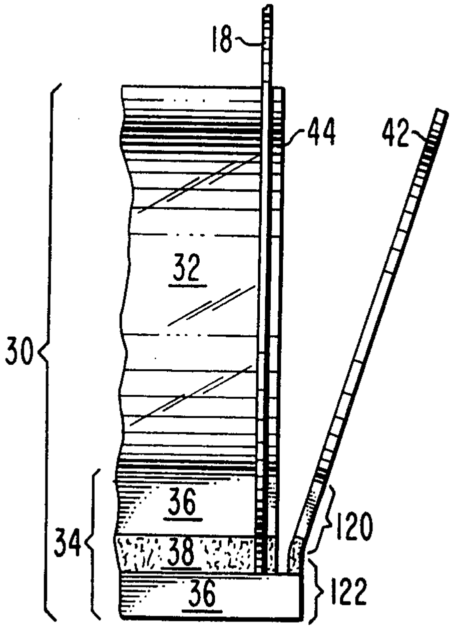
FIG. 4 illustrates a side view of an ingot in accordance with FIG. 3.

Each notch creates a preferential fracture region 116 in the rigid binding material 36. Each preferential fracture region 116 is an alignment with the vertex of the associated notch 114. The preferential fracture regions 116 comprise the region of preferential deformation of the support structure for this embodiment. Once a wafer has been sliced by the saw blade to the depth indicated by the dashed line 130 in FIG. 3, the portion of the binding material 36 above the line 130 (that portion which is attached to the just sliced wafer) is only as thick as the wafer. This may be seen from the side view of the ingot as illustrated in FIG. 4. The wafer and the rigid material (120) above the preferential fracture sensitive region 116 is bound to the rigid material (122) below the preferential fracture region 116 only by the rigid material of region 116 and the compliant material 38.

When the wafer 44 is bent away from the saw blade 18 by the fluid jet, the rigid material of region 116 is placed under greater strain than the remainder of the rigid material 36. The depth of the notches 114 controls the amount of force required to fracture the regions 116. The depth of the notches is selected to cause the region 116 to fracture upon the application of a moderate force to the wafer and well before the wafer would either break or separate from the binding material 36.

The compliant material 38 needs (1) to be one which will not gum up the saw blade in a harmful manner, (2) to adhere to the material 36 well enough and be strong enough that it holds the portion 120 to the portion 122 after the fracturing of regions 116 and (3) to be compliant enough that it will bend to allow the wafer to lean on wafer support 20 during the application of the leaning force and preferably to remain in that position after the removal of the leaning force. The compliant material 38 does not break and remains intact after the regions 116 fracture. A preferred compliant material is polyurethane. However, many other materials may be used so long as they meet the above criteria. The specific degree of adhesion and compliance which are desirable depend on the size, thickness and density of the wafers being sliced.

The portion 120 of the rigid binding material remains attached to the wafer after the leaning of the wafer and the fracturing of the regions 116, while the portion 122 remains a part of the rigid structure of the ingot.

Once the just sliced wafer has been leaned to the side clear of the blade, the ingot is retracted far enough from the plane of the saw blade that the just-sawn surface of the boule will be clear of the blade as the blade returns to its initial position. This retraction is preferably about 1 mil when using an 8 to 10 mil wide blade which yields a 10 to 12 mil wide kerf. Once both the wafer and the face of the boule are clear of the blade's return path, the blade returns to its initial position. Although the leaning of the wafer, the retraction of the boule and the return stroke of the blade have been described as sequential events, in practice, they may be performed simultaneously because the cutting edge of the blade is initially in the support structure 34 and by the time the cutting edge of the blade begins to leave the support structure 34, the wafer has been leaned clear of the blade and the boule has been retracted clear of the blade. The previously described ingot retraction technique using the ingot advancing stepping motor and a dog captivator is preferred, however, any other technique which accomplishes the purpose may be used.

The use of both the wafer leaning and the ingot retraction is preferred since that yields wafers on which both sides are free of return stroke damage. However, if only one side needs to be free of such damage, wafer leaning may be used without ingot retraction.

Once the saw blade has returned to its initial or rest position where it is clear of the ingot, the ingot carrier 14 is indexed forward to place the ingot in position for the slicing of the next wafer. A certain amount of backlash in the gear drive system between the stepping motor 96 and the dog 90 is inherent in a gear system. This gear system backlash is experimentally determined and compensated for by adjusting the number of stepping motor pulses used to index the ingot. As the gear train wears, it may from time to time become necessary to readjust the number of stepping motor pulses utilized to compensate for gear train backlash.

Once a number of wafers have been sliced and leaned against the support bar 22, the table 12 is retracted while the blade is in its initial or rest position and the sawn wafers are removed from the ingot. This may preferably be done by fracturing the portion 122 of the rigid binding material 36 in alignment with the most recently cut saw kerf. The table 12 may then be advanced to the cutting position and the ingot carrier indexed to align the next wafer for slicing.

Figure 5:
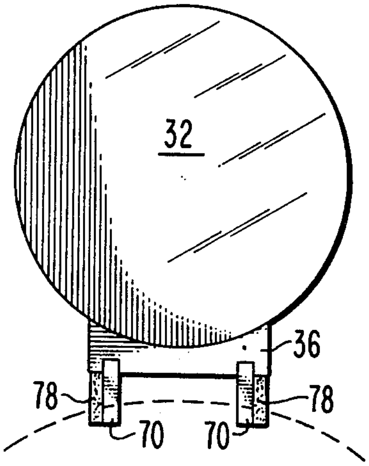
FIGS. 5 and 6 illustrate two of many possible alternative ingot configurations.

An alternative support structure for the ingot is illustrated in FIG. 5. This structure is formed by positioning prefabricated carbon legs 70 in a mold along with the boule prior to the casting of the rigid binding material 36. A compliant material 78 is applied to the prefabricated legs to retain the wafer when the legs 70 fracture upon application of the fluid jet to the main wafer surface. The compliant material 78 may be in the form of tape or a painted on layer, as desired.

Figure 6:
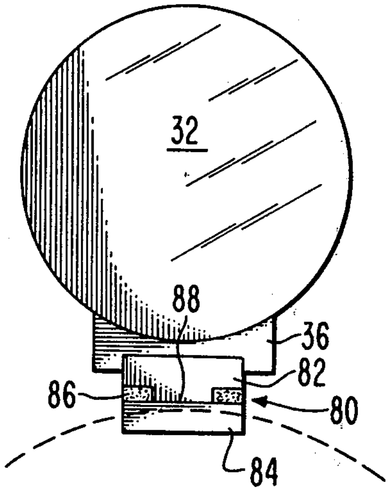

FIG. 6 illustrates a modified version of the support structure of the boule in which no fracture needs to take place in order to deform the support structure and lean the wafer clear of the blade. This is accomplished by providing a two piece pedestal 80 in the mold with the boule prior to the casting of the rigid binding material 36. The preformed pedestal is separated into an upper rigid piece 82 and a lower rigid piece 84 which are held together by a thin layer 88 of compliant material. The layer 88 of compliant material may also comprise thicker segments 86 as illustrated, if desired. Once the rigid material of the upper piece 82 has been sawn, a wafer is easily hinged away from the boule by the fluid jet. With this configuration of the support structure, in order to assure that the wafer will lean away from rather than toward the saw blade, it may be desirable to activate the fluid jet before the rigid material of the upper portion 82 has been sliced all the way through.

Saw and ingot configurations for protecting the just-sawn surfaces of the wafer and ingot have been shown and described. Those skilled in the art will be able to make numerous modifications in the preferred embodiments without departing from the scope of the appended claims.

What is claimed is:

1. An ingot comprising:

a boule of material to be sliced into wafers; and a support structure bonded to said boule, said support structure having a region of preferential deformation which will preferentially deform when a just-sawn wafer is leaned away from the just-sawn face of said boule.

2. The boule recited in claim 1 wherein:

said region of preferential deformation includes a preferential fracture sensitive zone where a first support material will fracture upon application of a leaning force and said ingot further comprises:

compliant means for retaining said wafer attached to said ingot.

3. The structure recited in claim 2 wherein said support structure comprises a boule gripping portion and at least one depending leg, said preferential fracture sensitive zone being in said at least one leg.

4. The structure recited in claim 1 wherein said zone of preferential deformation comprises a thin layer of compliant material.

5. The structure recited in claim 2 wherein said support structure comprises: said a gripping portion of a first material which grips said boule; and at least one leg comprising a different material which requires less force to cause the wafer to lean away from said just-sawn face of said boule than would said gripping material, said at least one leg including at least a portion thereof which prevents said just-sawn wafer from separating from said ingot upon leaning away from said just-sawn face of said boule.

6. The structure recited in claim 5 wherein said different material is carbon.

7. The structure recited in claim 1 wherein said support structure comprises:

a binding material for gripping said boule, said binding material having two depending legs, said preferential fracture zone being in said legs; and compliant material affixed to the sides of the legs to retain said wafer after the fracturing of said binding material.

* * * * *